(12) United States Patent
Brogårdh et al.

(10) Patent No.: US 6,343,243 B1
(45) Date of Patent: Jan. 29, 2002

(54) METHOD FOR DETERMINING LOAD PARAMETERS FOR A MANIPULATOR

(75) Inventors: Torgny Brogårdh; Stig Moberg, both of Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 09/367,504

(22) PCT Filed: Mar. 2, 1998

(86) PCT No.: PCT/SE98/00365
§ 371 Date: Sep. 27, 1999
§ 102(e) Date: Sep. 27, 1999

(87) PCT Pub. No.: WO98/42482
PCT Pub. Date: Oct. 1, 1998

(30) Foreign Application Priority Data
Mar. 4, 1997 (SE) .............................................. 9700767

(51) Int. Cl.$^7$ ............................................. G05B 15/00
(52) U.S. Cl. ................... 700/258; 700/245; 700/248; 700/249; 700/250; 700/251; 700/257; 700/259; 700/260; 700/261; 700/262; 700/264; 900/15; 900/23; 900/28; 900/31; 900/42; 900/47; 900/48; 318/568.1; 318/568.21; 701/23
(58) Field of Search ................................. 700/245, 248, 700/249, 250, 251, 257, 259, 260, 261, 262, 264; 318/568.1; 701/568.21, 22; 900/15, 23, 28, 31, 42, 47, 48; 219/124.34; 341/20; 74/490.01

(56) References Cited

U.S. PATENT DOCUMENTS

4,969,108 A * 11/1990 Webb et al. ................. 700/259
5,416,392 A * 5/1995 Lee et al. ............... 318/568.21
5,767,648 A * 6/1998 Morel et al. ............. 318/568.1
6,232,891 B1 * 5/2001 Rosenbert ..................... 341/20
6,236,906 B1 * 5/2001 Muller ........................ 700/258

OTHER PUBLICATIONS

Stasi et al., Robust tracking control of robot manipulators via LKF–based estimator, 1999, pp. 1117–1124 vol. 3.*
Yucel et al., Design of a variable five–axes adjustable configuration robot manipulator, 1994, pp. 695–698 vol. 2.*

(List continued on next page.)

Primary Examiner—William A. Cuchlinski, Jr.
Assistant Examiner—McDieunel Marc
(74) Attorney, Agent, or Firm—Connolly Bove Lodge & Hutz LLP.

(57) ABSTRACT

A method for determining a number of load parameters ($m_l$, $x_l$, $r_l$, $\alpha_l$, $I_x$, $I_y$, $I_z$) for a load (6) which is carried by a manipulator. The manipulator comprises a number of links (2,3,4) which are movable in relation to one another, a handling member (5) for supporting a tool, which handling member is movable in relation to said links, a number of axes (A1–A6) around which the links or the handling member are/is movable as well as a motor for each axis which drives the movement of the axis in accordance with supplied reference values for the torque of the motor. According to the method, the manipulator adopts two selected axis configurations. A number of identification axes are appointed. The manipulator is run such that the identification axes carry out a plurality of movements according to predetermined patterns. During these movements, the motor torque and the axis angle are measured. The moments of gravitational force of the identification axes are calculated on the basis of measured motor torques during a first movement. The mass inertia is calculated with correlation between measured motor torques and calculated acceleration during a second movement. The load parameters are calculated from the calculated moments of gravitational force and the mass inertias with the aid of the movement equations of the identification axes.

9 Claims, 3 Drawing Sheets

OTHER PUBLICATIONS

Mark et al., Redundancy resolution of manipulators through torque optimization, "Robot Control Dynamics, Motion Planing, And Analysis" 1987.*

Lin, Shir–Kuan, "Estimating Minimal Parameters Of A Manipulator For Gravity Load And Friction", IFAC 12th Triennial World Congress, 1993, pp. 415–420.

Olsen, Howard B., et al., "Identification of Robot Dynamics", vol. 2, Proceedings 1986 IEEE International Conference on Robotics and Automation, 1986, San Francisco, CA, pp. 1004–1010.

Walker, Michael W., "Estimating Manipulator Load Mass Properties", IEEE, 1987, pp. 210–213.

Mukerjee, Amitabha, et al., "Self–Calibration in Robot Manipulators", 1985 IEEE International Conference on Robotics and Automation, St. Louis, MO, 1985, pp. 1050–1057.

Skiar, Michael E., et al., "Dynamic Model Calibration For Rigid–Link Serial Manipulators", Proceedings of the 1990 ASME International Computers in Engineering Conference and Explosition, Boston, MA, pp. 101–109.

* cited by examiner

METHOD FOR DETERMINING LOAD PARAMETERS FOR A MANIPULATOR

TECHNICAL FIELD

The invention relates to a method for determining dynamic parameters in a dynamic model of a manipulator. In particular, it relates to dynamic parameters for tool loads and arm loads, so-called load parameters.

BACKGROUND ART

By manipulator is meant an industrial robot or external axes connected to the industrial robot, for example for orientation and movement of a work object or for movement of the robot itself. A manipulator comprises one or more arms which are movable in relation to one another, and a handling member which is provided with a tool attachment and which is movable relative to the arm which supports it. The handling member may, for example, be a single platform or a robot hand which is movable in one or more degrees of freedom. The manipulator is provided with a control system which controls the position and orientation of the handling member. For each one of the movement axes of the manipulator, servo equipment with a drive motor is provided. The servo system of each axis is supplied with a reference value for the angle of rotation of the axis and the drive motor of the axis brings the manipulator to move in the axis in question until the axis position corresponds to the reference value supplied to the servo system.

By an axis are meant axis transmissions which may give rise to both rotation and translation of the movable arms and the handling member of the manipulator.

When the manipulator moves, its axes are subjected to forces and torques which originate from dynamic effects such as mass inertia, coupled mass inertia, Coriolis forces, centrifugal forces, the gravitational force, static friction and dynamic friction. In connection with robots, static friction means sliding friction in bearings and gear wheels. This friction depends on the sign of the velocity but not on the magnitude thereof. By dynamic friction is meant that friction which increases with the magnitude of the velocity and which depends on friction in oil, seals, etc. To be able to control the manipulator with high accuracy and maximum velocity, it is necessary that the servo system should compensate for the forces and torques which are caused by the dynamic effects.

How the dynamic effects influence each one of the axes of the manipulator may be described by means of a dynamic model for the manipulator. The dynamic model consists of the movement equation system of the robot. From the dynamic model, the forces and torques which act in each one of the axes may be calculated. A condition for being able to control the movements of the manipulator with high accuracy is that the dynamic effects during the movements may be calculated accurately. The dynamic model comprises model parameters which must be known in order to be able to calculate the dynamic effects. These model parameters comprise mass, centre of gravity and mass inertia for the parts of the manipulator and the load thereof. The dynamic effects from the manipulator parts which are included in the basic design of the manipulator may be calculated accurately since the masses, centres of gravity and mass inertias of these manipulator parts are-well-known.

However, when being used, the manipulator will carry both tool loads and arm loads, and these loads may vary greatly between various applications. Examples of tool loads may be a tool which is mounted on the handling member, for example a glue gun or a welding gun or a workpiece which is moved between two points of the manipulator. Arm loads may, for example, be a transformer which belongs to the tool, a roll with welding wire or a pump for gluing or painting. To obtain high performance, the servo system including the trajectory generator must also compensate for the dynamic effects which arise as a result of tool and arm loads. To be able to calculate the dynamic effects from a load, the model parameters for the load, that is, the mass of the load, the centre of gravity, and the mass inertia must be known. In the following, the model parameters of the load will be referred to as load parameters.

It is, of course, possible to find out the load parameters by weighing the load, measuring its centre of gravity and calculating or measuring its mass inertias and then feeding these values into the control system. This method is known, for example from patent document EP 260 326. The forces and torques which act in each one of the axes are then calculated from the dynamic model, whereafter the servo system compensates for these forces and torques. A disadvantage of this method is that, in, for example, material handling applications, the manipulator may, in the same installation, handle a large number of objects of different weights and shapes, whereby the work of obtaining and feeding the load parameters for all the objects takes a long time and there is a considerable risk of incorrect parameters being fed into the control system.

The publication by Olsen and Bekey, "Identification of Robot Dynamics", 1986 IEEE International Conference on Robotics and Automation, pages 1004–1010, discloses a method for identification of the load parameters. This method is based on an equation system of equations of movement being set up for the robot. The equations of movement are parametrized in the mass parameters for the dynamic bodies of the robot. First, the greatly non-linear movement equation system of the robot is linearized. Then, an identification is made by means of the least-squares method. A disadvantage of this method is that also unwanted parameters as, for example, Coulomb friction and viscous friction, must be identified. This implies that errors in the identification of these unwanted parameters directly reduce the accuracy in the identification of the unwanted parameters. Also, unnecessary movements will be required for identifying the unnecessary parameters. For example, the bodies must be moved at a relatively high velocity for accurate identification of the viscous friction. A result of this is that large robot movements are required, which is a disadvantage during load identification. An additional problem which implies that larger movements are required is that noise in measured motor torques and axis angles disturb the identification. A large number of unnecessary calculations will also be made, which is a disadvantage, especially during implementation in a real-time system. Still another problem is that the linearization of the non-linear movement equations leads to identification errors which are difficult to check.

OBJECTS AND ADVANTAGES OF THE INVENTION

The object of the invention is to suggest an automatic method for identification of load parameters, which is fast and reliable. To avoid the above-mentioned disadvantages, the method shall entail a selective identification of the parameters and not be based on linearization of the movement equations.

What characterizes a method according to the invention will become clear from the appended claims.

The method according to the invention has the following advantages:
- the load need not be dismantled during the identification,
- the identification is very fast; it takes only a few seconds,
- the identification can be carried out anywhere in the operating range of the manipulator,
- the identification requires only small movements of the manipulator, so it can be carried out in narrow spaces or at specially reserved locations,
- the identification can be carried out with different movement patterns, whereby the movement pattern which suits the current installation is chosen,
- the identification can be carried out in the current application program without any special movements having to be made.

The above-mentioned advantages are achieved partly by using a correlation method for identification of the dynamic parameters of axes, partly by making this identification selectively for the gravitation, mass inertia and coupled mass inertia of the axes, and partly by calculating the load parameters exactly from the dynamic parameters of the axes by using the movement equations of the axes. The correlation method is integrating over the whole movement and therefore provides a great noise reduction with respect to the noise of the torque signals and the position signals. By correlating the torque signals with the calculated acceleration signals, the effect of, for example, Coulomb friction, viscous friction, Coriolis forces and centrifugal forces will be suppressed and a selective identification of mass inertia and gravitation be obtained. By finding exact expressions for the relation between the dynamic parameters of the axes and the load parameters, the high accuracy during the identification of the dynamic parameters of the axes will then be maintained when the load parameters are finally calculated.

DESCRIPTION OF THE PREFERRED EMBODIMENTS

Figure 1:
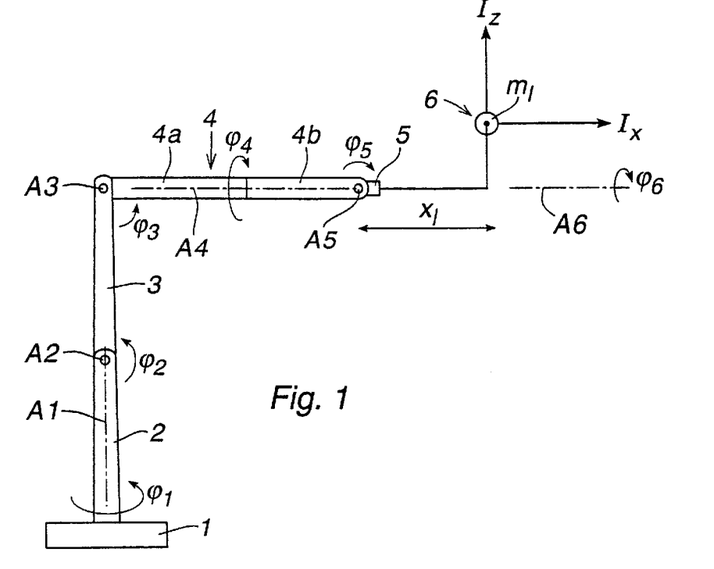
FIG. 1 schematically shows an industrial robot in a first configuration, in a view seen from the side.
Figure 2:
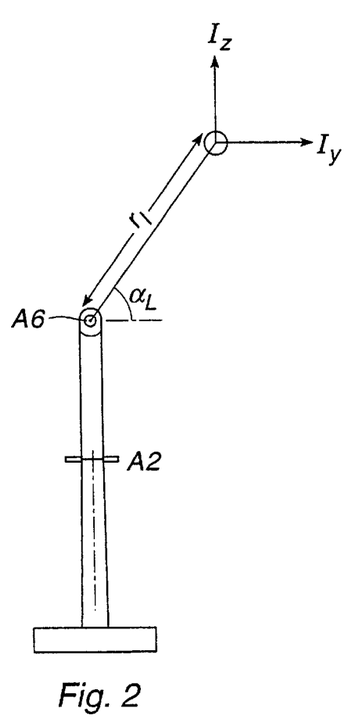
FIG. 2 shows the robot in the first configuration, in a view seen from the front.

FIGS. 1 and 2 schematically show an industrial robot in a first configuration. FIG. 1 shows the robot seen from the side whereas FIG. 2 shows the robot seen from the front. The foot 1 of the robot is fixedly mounted on a base. The robot has a base stand 2, which is rotatable in relation to the foot 1 around a vertical axis A1. In the upper end of the base stand, a first robot arm 3 is journalled and rotatable in relation to the base stand around a second axis A2. In the outer end of the arm, a second arm 4 is journalled and rotatable in relation to the first arm around an axis A3. The robot arm 4 comprises two parts 4a and 4b, the outer part 4b being rotatable in relation to the inner part 4a around an axis of rotation A4 coinciding with the longitudinal axis of the arm. The second arm 4 supports, at its outer end, a so-called robot hand 5, which is rotatable around an axis of rotation A5 which is perpendicular to the longitudinal axis of the arm. The outer part of the robot hand is rotatable in relation to its inner part around an axis of rotation A6. The axes A4, A5 and A6 belong to the robot hand and will be referred to by the comprehensive term wrist axes.

The movements in all the axes of the robot comprise rotations and the positions of the axes (angle of rotation relative to a reference position) are designated $\phi_1, \phi_2 \ldots \phi_6$. In its outer part the robot hand supports a load 6. The load has the mass $m_1$ and the position of the mass centre in relation to the robot hand may be described by the coordinates $x_l, r_l, \alpha_l$. The principal mass inertias of the load are designated $I_x, I_y, I_z$.

For each one of the axes of the robot, a movement equation may be set up. The movement equation shows how the torque, to which the axis is subjected during the movement of the robot, depends on the dynamic multi-body effects. The torque for an axis is normally generated by a motor via a gear. The movement equation for axis i is:

$$\tau_i = J_i(\bar{\varphi}) \cdot \ddot{\varphi}_i + \tau_{fric,i} + \sum_j C_{cent,j}(\bar{\varphi}) \cdot \dot{\varphi}_j^2 + \qquad (1)$$

$$\sum_j C_{cor,j}(\bar{\varphi}) \cdot \dot{\varphi}_j \cdot \dot{\varphi}_i + \tau_{grav,i}(\bar{\varphi}) + \tau_{dynfric,i}(\dot{\varphi}_i) + \sum_j J_{ji}(\bar{\varphi}) \cdot \ddot{\varphi}_j$$

$\tau_i$: torque for axis i,
$\bar{\varphi}$: $\phi_1, \phi_2 \ldots, \phi_6$, i.e. the configuration of the robot
$\phi_i$: position of axis i,
$\dot{\phi}_i$: velocity of axis i,
$\ddot{\phi}_i$: acceleration of axis i,
$J_i(\bar{\varphi})$: mass inertia of axis i in a configuration given by the angles $\bar{\varphi}$,
$J_i(\bar{\varphi}) \cdot \ddot{\phi}_i$: torque contribution from the mass inertia,
$\tau_{fric,i}$: torque contribution from the static friction; the sign depends on the direction of the movement, $$\sum_j C_{cent,j}(\bar{\varphi}) \cdot \dot{\varphi}_j^2:$$

torque contribution from the centrifugal forces, $$\sum_j C_{cor,j}(\bar{\varphi}) \cdot \dot{\varphi}_j \cdot \dot{\varphi}_i:$$

torque contribution from Coriolis forces,
$\tau_{grav,i}(\bar{\varphi})$: torque contribution from the gravitational force,
$\tau_{dynfric,i}(\dot{\phi}_i)$: torque contribution from the dynamic friction,
$J_{ji}(\bar{\varphi})$: coupled mass inertia between axes i and j, $$\sum_j J_{ji}(\bar{\varphi}) \cdot \ddot{\varphi}_j:$$

torque contribution from the coupled mass inertias.

$J_i, J_{ji}, \tau_{dynfric,i}, \tau_{grav,i}, C_{cor,j}, C_{cent,j}, \tau_{fric,i}$ constitute the dynamic parameters of the movement equation. As is clear from the movement equation, most of the dynamic parameters are changed with the movement of the axes, that is, they depend on the configuration $\bar{\phi}$ of the robot.

To be able to determine the load parameters $m_l$, $x_l$, $r_l$, $\alpha_l$, $I_x$, $I_y$, $I_z$, a number of equations must be set up, which give the load parameters as a function of a number of known and/or measurable quantities. When the robot is in a certain configuration, given by the angles $\bar{\phi}$, the moment of gravitational force, the mass inertia and the coupled mass inertias of axis i are dependent on the load parameters:

$$\tau_{grav,i}(\bar{\phi}) = F_1(\bar{\phi}, m_l, r_l, x_l, \alpha_l) \quad (2)$$

$$J_i(\bar{\phi}) = F_2(\bar{\phi}, m_l, r_l, x_l, \alpha_l, I_x, I_y, I_z) \quad (3)$$

$$J_{ji}(\bar{\phi}) = F_3(\bar{\phi}, m_l, r_l, x_l, \alpha_l, I_x, I_y, I_z) \quad (4)$$

From this general equation system, which is set up for one or more axes i, expressions may be derived for each one of the load parameters:

$$m_l = H_1(\Phi, \bar{\tau}_{grav}, \bar{J}, \bar{J}_{ji})$$

$$x_l = H_2(\Phi, \bar{\tau}_{grav}, \bar{J}, \bar{J}_{ji})$$

$$r_l = H_3(\Phi, \bar{\tau}_{grav}, \bar{J}, \bar{J}_{ji})$$

$$\alpha_l = H_4(\Phi, \bar{\tau}_{grav}, \bar{J}, \bar{J}_{ji}) \quad (5)$$

$$I_x = H_5(\Phi, \bar{\tau}_{grav}, \bar{J}, \bar{J}_{ji})$$

$$I_y = H_6(\Phi, \bar{\tau}_{grav}, \bar{J}, \bar{J}_{ji})$$

$$I_z = H_7(\Phi, \bar{\tau}_{grav}, \bar{J}, \bar{J}_{ji})$$

where p=the number of axes used during identification of the load parameters, and k=the number of configurations included in the identification are defined:

Φ: a p*k matrix where the elements consist of the axis angles $\bar{\phi}$ of the robot at the different configurations.

$\bar{\tau}_{grav}$: a p*k matrix where the elements consist of the moments of gravitational force $\tau_{grav,i}(\bar{\phi})$ of the axes which are used during the identification of the different configurations.

$\bar{J}$: a p*k matrix where the elements consist of the mass inertias $J_i(\bar{\phi})$ of the axes which are used during the identification at the different configurations.

$\bar{J}$: a p*(p−1)*k/2 matrix where the elements consist of the coupled mass inertias $J_{ji}(\bar{\phi})$ between the axes i and the axes j at the different configurations.

If the dynamic parameters $\tau_{grav,i}(\bar{\phi})$, $J_i(\bar{\phi})$ och $J_{ji}(\bar{\phi})$ can be determined, then the load parameters may be calculated. The matrices Φ, $\bar{\tau}_{grav}$ etc normally contain a large number of zero-valued elements. This means that only few elements are needed to determine the load parameters. The configurations should be chosen such that good numerical conditioning is obtained for the equation system formed, (2)–(4). In principle, it is possible to choose arbitrary configurations, but the configurations must be chosen in such a way that the equation system obtained has not become underdetermined and such that the conditioning parameter becomes sufficiently low. The conditioning parameter is a measure of how sensitive the solution of the equation system is to disturbances in input data and parameters. By choosing suitable configurations for the robot, the solution of the equation may be simplified, while at the same time the numerical accuracy may be optimized.

If the load can be approximated with a point mass, that is, if the mass inertia of the load is negligible, the load parameters $m_l$, $x_l$, $r_l$, $\alpha_l$ may be calculated from one configuration only. At least two configurations are required if also the mass inertia components $I_x$, $I_y$, $I_z$ for the load are to be calculated.

Taking into consideration the above reasoning, a number of suitable configurations are chosen for determining the load parameters. For each configuration, based on known physical and geometrical relationships, a number of equations for each one of the load parameters are set up, equations 2–5. In these equations, the load parameters are dependent on dynamic parameters associated with the movement equation of the robot. One condition for determining the load parameters is thus that the dynamic parameters which are included in these equations can be identified. According to the invention, the dynamic parameters for a given configuration are determined by the robot assuming the given configuration, whereupon at least one of the axes is rotated in such a way that a movement according to a predetermined pattern is imparted to the load. During the movement, the torque for the motor or motors which drive the movement, and/or are influenced by the movements of the other axes, is registered as a function of the time or the axis position. Starting from the registered motor torques and the axis angles, the dynamic parameters are identified according to some identification method.

To minimize the error during the identification of the dynamic parameters, it is often an advantage that the identification take place only with the aid of the wrist axes (A4, A5 or A6), since uncertainties of the dynamic model are least for these axes and since in that way a separation is obtained between the identification of tool loads and arm loads. Since most parameters in the movement equation are changed with the movements of the axes, the identification should be made with as small movements as possible. In addition, the current robot installation may give limitations to the movements of the axes. From this follows that short movements are preferable during the identification. Using short movements means that the torque contributions from the velocity-dependent forces such as Coriolis, centrifugal and dynamic friction become small and the torque contributions from gravitation, friction, mass inertia and coupled mass inertia will dominate the movement equation.

To obtain as high accuracy as possible during the identification, the movement of the axes should be made such that as few terms as possible in the movement equation provide contributions to the motor torque. Regardless of how the movements are chosen during the identification, the friction will still provide a contribution to the motor torque. It is, therefore, necessary to compensate for the friction during the identification. Depending on which identification method is used, the torque contribution from the friction may either be identified simultaneously with the other components or separately.

Figure 3:
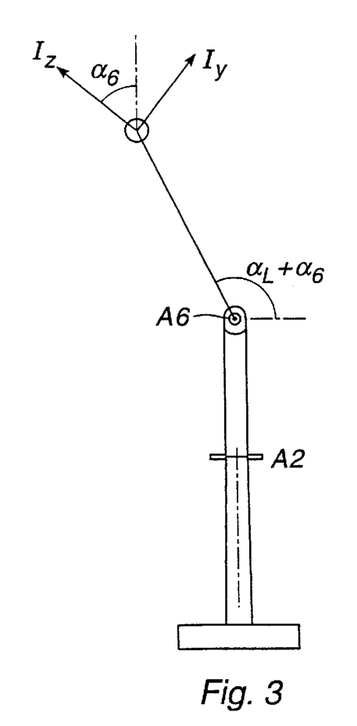
FIG. 3 shows the robot in a second configuration, in a view seen from the front.

The following is an example of how the load parameters may be determined with the aid of two robot configurations. In FIGS. 1 and 2, a first configuration K1 is shown and in FIG. 3 a second configuration K2 is shown, which differs from the first one only in that the axis A6 has been rotated through the angle $\alpha_6$. To obtain a good accuracy, it is important that $\alpha_6$ should not be too small. From known physical and geometrical relationships, equations may be set up which describe the load parameters as a function of the dynamic parameters. As examples, the equations for $m_l$ and $x_l$ are shown:

$$m_l = \frac{\tau_{grav6}(K1) \cdot (\tau_{grav5}(K1) - \tau_{grav05}(K1))}{J_{65}(K1) \cdot g^2} = \qquad (6)$$

$$H_1(\tau_{grav6}(K1), \tau_{grav5}(K1), J_{65}(K1))$$

$$x_l = \frac{J_{65}(K1) \cdot g}{\tau_{grav6}(K1)} = H_2(\tau_{grav6}(K1), J_{65}(K1)) \qquad (7)$$

$$r_l = H_3(\tau_{grav6}(K1), \tau_{grav6}(K2), \tau_{grav5}(K1), J_{65}(K1), m_l, x_l) \qquad (8)$$

$$\alpha_l = H_4(J_{65}(K1), m_l, x_l, r_l) \qquad (9)$$

$$I_x = H_5(\tau_{grav6}(K2), \tau_{grav5}(K1), J_6(K1), J_{65}(K1), r_l) \qquad (10)$$

$$I_y = H_6(\tau_{grav6}(K2), J_5(K2), J_{65}(K1), m_l, x_l) \qquad (11)$$

$$I_z = H_7(\tau_{grav6}(K2), J_5(K2), J_5(K1), J_{65}(K1), m_l, x_l) \qquad (12)$$

$\tau_{grav05}(K1)$: moment of gravitational force in axis A5 with the robot in the first configuration and without load, which is a known variable.

If the mass inertia $I_x$ is negligible, $m_l$, $r_l$, $\alpha_l$ and $x_l$ may be determined with the aid of the dynamic parameters $\tau_{grav5}(K1), \tau_{grav6}(K1), J_{65}(K1), J_6(K1)$. Thus, it is sufficient with a first robot configuration to determine certain load parameters. If all the load parameters are to be determined, at least two configurations are required.

For calculation of all the load parameters, it is thus sufficient to identify $\tau_{grav6}(K1), \tau_{grav6}(K2), \tau_{grav5}(K1), J_6(K1), J_5(K2), J_5(K1), J_{65}(K1)$, that is, to determine, in the first configuration, the moment of gravitational force for axis A5 and axis A6, the mass inertia for axis A5 and axis A6 and the coupled mass inertia between axis A5 and axis A6, and to determine, in the second configuration, the moment of gravitational force for axis A6 and the mass inertia for axis A5. These dynamic parameters all originate from axis A5 and axis A6, that is, the outermost wrist axes.

In an alternative embodiment, some of the other wrist axes, axis A5 or axis A4, may instead be rotated to arrive at the second configuration. Which of the three wrist axes is rotated is of no significance; the result will still be the same. If axis A4 is rotated instead of axis A6 in the above example, the moment of gravitational force for axis A4 and axis A5, the mass inertia for axis A5 and axis A4 and the coupled mass inertia between axis A5 and axis A4 must be identified.

One problem when determining the dynamic load parameters is that there is a variation between the torque constants of the different motors. If the torque constant, for example, has a variation of 10%, a corresponding error in the identification will be obtained. However, the torque constant of a motor may be calibrated by mounting a load with some known load parameter on the robot and then determining the load parameter in accordance with the invention. It is, for example, sufficient to know only the mass of the load to identify $k_T$. This means that it is sufficient to weigh the load before it is mounted onto the robot. From equation 6 the following relationship is obtained:

$$k_T = \frac{m_L}{H_1(\tau_{grav6}(K1), \tau_{grav5}(K1), J_{65}(K1))} \qquad (13)$$

How the movement pattern when determining the dynamic parameters may be chosen is exemplified with reference to the above-mentioned example. When the moment of gravitational force $\tau_{grav,i}(K1)$ is to be determined, the robot is run to the first configuration. Thereafter, axis i is given a short reciprocating movement at a constant low velocity. The low velocity render all velocity- and acceleration-dependent terms negligible. In the movement equation (1), then only the torque contribution from the gravitation and the torque contribution from the static friction remain. The torque contribution from the gravitation is constant during the movement and the torque contribution from the static friction is constant in magnitude but changes signs when the movement changes direction.

Figure 4:
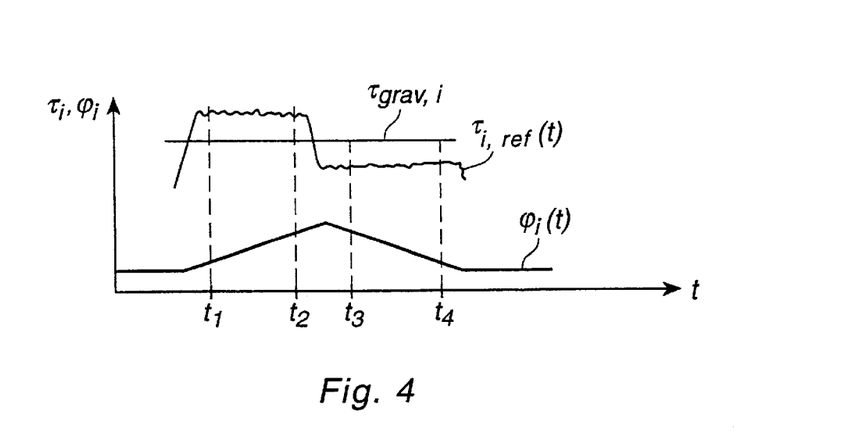
FIG. 4 shows an example of a suitable axis movement when determining the moment of gravitational force for an axis.

During the movement, the motor torque for axis i is registered. Preferably, that torque reference signal $\tau_{i,ref}$ is registered which the axis servo generates to the motor. FIG. 4 shows an example of a suitable movement during identification of the moment of gravitational force. The figure shows both the angle of rotation $\phi_i(t)$ and the motor torque $\tau_{i,ref}$ as a function of time. The moment of gravitational force may be identified by summing the mean values of the motor torques in the time intervals $[t_1, t_2]$ and $[t_3, t_4]$. In that way, the contributions from the static friction cancel one another. By means of this simple mean-value-forming method, the torque contributions from axis A5 and axis A6 may be accurately identified. An alternative method for mean-value formation is to use a low-pass filter which removes noise and high-frequency disturbance components in the torque-reference signal.

Figure 5:
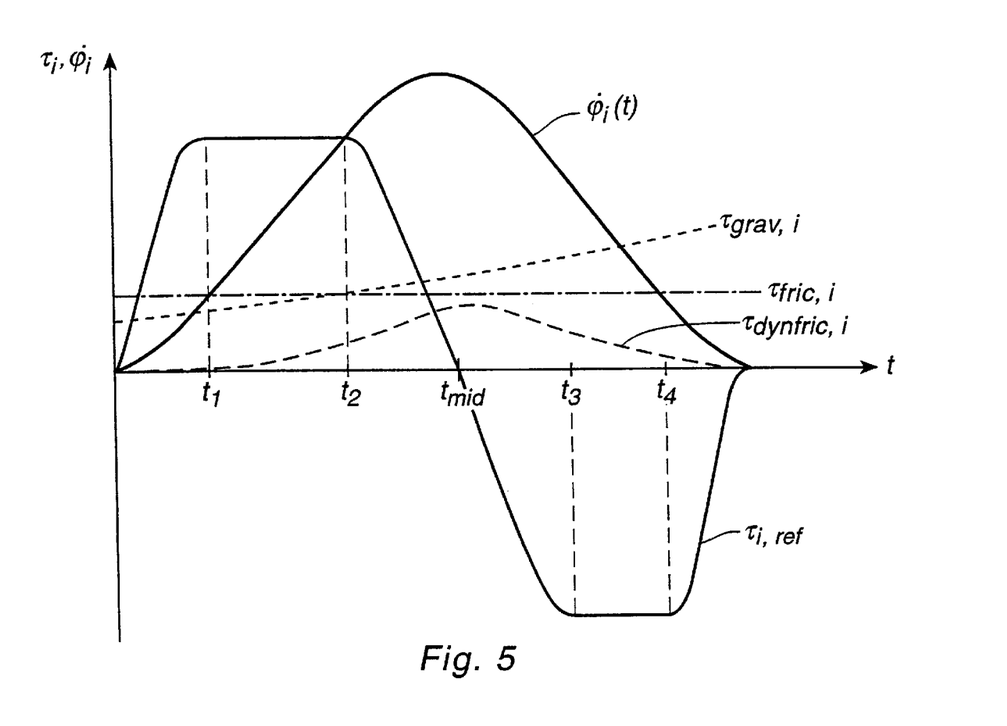
FIG. 5 shows an example of a suitable axis movement for determining the mass inertia for an axis.

From the movement equation 1 it is clear that the torque contribution from the mass inertia on axis i depends on the acceleration of the axis. When identifying the mass inertia for a certain axis, the axis thus has to be given a movement containing at least one acceleration distance and one deceleration distance. The movement is preferably short but it should attain as high a velocity as possible to achieve a sufficiently long acceleration distance. FIG. 5 shows an example of a suitable axis movement for determining the mass inertia of that axis which performs the movement. The figure shows the angular velocity $\dot{\phi}_i(t)$ and the torque reference signal $\tau_{i,ref}(t)$ as functions of the time during the movement. The movement starts with an acceleration which directly changes into a deceleration. The direction of movement is the same during the entire movement. It is an advantage if the movement is chosen such that the torque contribution from the gravitation varies symmetrically around the mid-point $t_{mid}$ of the movement, that is, that point of time when the acceleration changes into a deceleration. This means that the torque contributions from the gravitation will cancel one another during the identification and hence no compensation for the moment of gravitational force is needed. During the identification of the mass inertia, the motor torque $\tau_{i,ref}(t)$ is registered during the movement as a function of the time or the axis position and the acceleration $\ddot{\phi}_i(t)$ as a function of time or the axis position. Since only one axis is moving, the mass inertia $J_i(t)$ of the axis will be constant during the movement.

Figure 6:
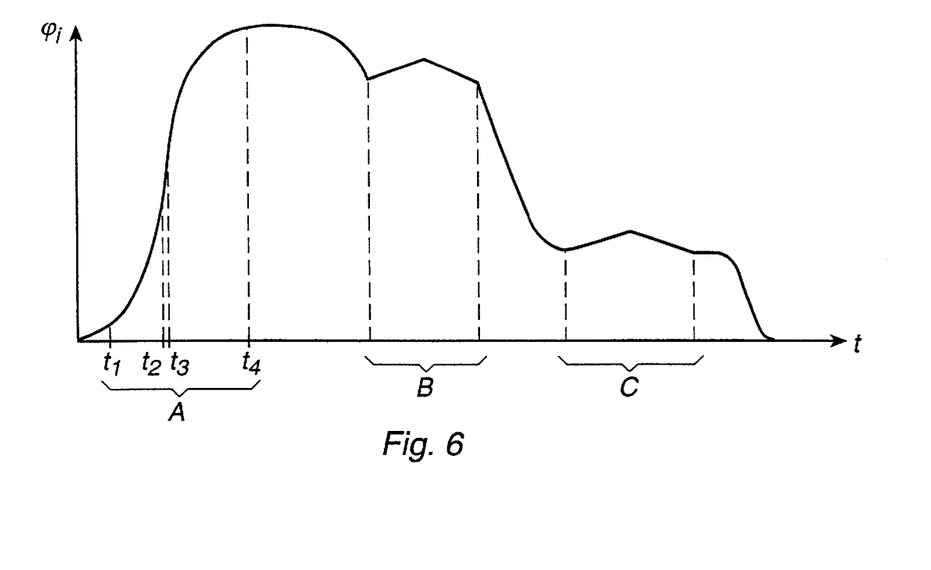
FIG. 6 shows an example of a movement which may be used for identifying the mass inertia in case of unsymmetrical gravitation.

If the movement is such that the torque contribution from the gravitation does not vary symmetrically around the mid-point of the movement, it may become necessary to identify the difference between the moment of gravitational force during the acceleration and the moment of gravitational force during the deceleration in order for the mass inertia of the axis to be calculated. When compensating for varying moments of gravitational force, it is necessary to identify the moment of gravitational force at least two locations in the movement. FIG. 6 shows a movement $\phi_i(t)$ which may be used for identifying the mass inertia in case of an unsymmetrical gravitation. The movement first comprises a short quick movement A with high acceleration values, which is used for calculating the mass inertia. Then follow two slow movements B and C, each of which comprising two different directions of movement and which are performed for axis angles which are positioned on opposite sides of the mid-point of the first movement A. B and C are the same movement as is shown in FIG. 4. From measured motor references for the movements B and C, the difference between the moments of gravitational force for the acceleration and the deceleration may be calculated.

Figure 7:
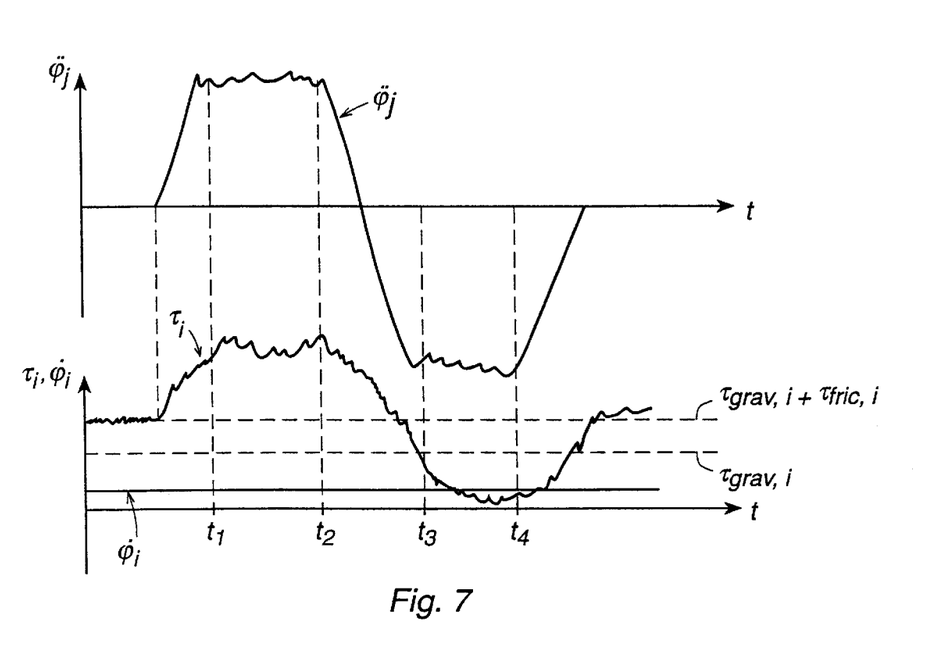
FIG. 7 shows an example of suitable movements for determining the coupled mass inertia between two axes.

To be able to identify $J_{ji}$, that is, the coupled mass inertia on axis i from axis j, axis j performs the same movement as is shown in FIG. 5 while at the same time axis i is run with a low constant velocity to obtain a well-defined state with respect to the friction. The low velocity renders all velocity-dependent terms negligible and the contribution from the gravitation constant. FIG. 7 shows suitable movements for axis i and axis j for determining the coupled mass inertia between axis i and axis j. The figure shows the acceleration $\ddot{\phi}_j(t)$ of axis j as a function of the time and the velocity $\dot{\phi}_i(t)$ of axis i as a function of the time. Further, the reference motor torque for axis i as a function of the time is shown.

For identification of mass inertia and coupled mass inertia, a method based on correlation is used. Measured values are then correlated with functions of other measured values. When identifying the mass inertia of an axis, the axis is first accelerated over a distance, whereupon it is decelerated to a standstill. During this movement, there are summed, for each measurement moment, the product of the axis torque $T_A(t_k)$ and the axis acceleration $A_A(t_k)$ as well as the acceleration $A_A(t_k)$ squared. The mass inertia is then identified as the quotient between these sums. Instead of the actual acceleration, the reference acceleration to the controller may be used. The axis torque normally consists of the reference torque from the controller to the drive device of the motor.

If the gravitation is changed unsymmetrically around the mid-point of the calibration distance, a compensation for the gravitation $T_G(t_k)$ is made. The expression for the identified mass inertia now becomes the sum of $T_A(t_k)*A_A(t_k)$ minus the sum of $T_G(t_k)*A_A(t_k)$, and these two sums are divided by the sum of $A_A(t_k)$ squared. The summations are made for all samples $t_k$ during the movement. Possibly, a few samples at the beginning and at the end of the movement may be eliminated.

The coupled mass inertia is identified as the sum of the product of the axis torque for the slow-moving axis $T_{Ai}(t_k)$ and the acceleration of the rapidly accelerating/decelerating axis $A_j(t_k)$, this sum being divided by the sum of the acceleration $A_{Aj}(t_k)$ of the "rapid" axis squared. Also here the summations are made over essentially all the samples $t_k$ of the movement. In the embodiment, the relationships between the load parameters and the dynamic parameters, the moment of gravitational force, the mass inertia and the coupled mass inertia are used for determining the load parameters. One advantage of using precisely these dynamic parameters is that it is sufficient with small robot movements for the identification. It is also feasible to use the torque contributions from the centrifugal forces or the Coriolis forces for calculating the load parameters. However, a disadvantage is that this requires large robot movements for the torques from these forces to become sufficiently large.

Identification axes are those axes which are used for the identification of the dynamic parameters.

What is claimed is:

1. A method for determining a number of load parameters ($m_l$, $x_l$, $r_l$, $\alpha_l$, $I_x$, $I_y$, $I_z$) for a load (6) which is carried by a manipulator which comprises a number of links (2,3,4) which are movable in relation to each other, a handling member (5) for supporting a tool or a work object, which handling member is movable in relation to said links, a number of axes (A1–A6) in relation to which the links or the handling member is movable, and a motor for each axis which drives the movements of the axis in accordance with supplied reference values for the torques of the motor, characterized in that it comprises the steps of:

a) appointing at least two of the axes identification axes, b) the manipulator adopting a first axis configuration (K1), c) running both identification axes such that a first movement is imparted to them which has a substantially constant velocity and which at first takes place in a first direction and then in a second direction which is opposite to the first one, measuring and recording the torque and the angle of the identification axes during the first movement, calculating the moment of gravitational force ($\tau_{grav,i}(\bar{\phi})$) of the identification axes by summation of the mean value of the measured torque in one direction of movement and the mean value of the measured torque in the other direction of movement, d) running the identification axes separately such that a second movement is imparted to them which comprises an acceleration distance and a deceleration distance measuring and recording the torque and the angle of the identification axes during the second movement, determining the acceleration by deriving measured values of the angle, calculating product elements by multiplying measured values of the torques and the calculated accelerations, whereupon the mass inertia ($J_i(\bar{\phi})$) is calculated by correlation as the sum of the product elements divided by the sum of the accelerations squared, e) the manipulator adopting a second axis configuration (K2), whereupon steps c and d are repeated for at least one of the identification axes, f) calculating the load parameters from the calculated moments of gravitational force and the mass inertias with the aid of the physical and geometrical relations of the identification axes.

2. A method according to claim 1, characterized in that for at least one of said configurations, a first one of the identification axes is given a movement which comprises an acceleration distance and a deceleration distance, during this movement, the angle of the first identification axis is measured and recorded, the acceleration of the first identification axis is calculated by deriving measured values of the angle, in a second identification axis, the torque of the identification axis is measured and recorded, product elements are calculated by multiplying measured values of the torque of the second identification axis and the calculated accelerations for the first identification axis, the coupled mass inertia ($J_{ji}(\bar{\phi})$) between the first and second idenfication axes is calculated by correlation as a sum of the product elements divided by the sum of the accelerations for the first identification axis squared, the load parameters are calculated from the calculated moments of gravitational force, the mass inertias and the coupled mass inertia ($J_{ji}(\bar{\phi})$) with the aid of the physical and geometrical relations of the identification axes.

3. A method according to claim 2, characterized in that for calculating the coupled mass inertia, the second identification axis is given a movement which has only one direction and this takes place at the same time as the first axis is given its movement.

4. A method according to claim 1, characterized in that the identification axes consist of some combination of axes A3, A4, A5 and A6.

5. A method according to claim 1, characterized in that the identification axes consist of axes A5 and A4 or A5 and A6.

6. A method according to claim 1, characterized in that the second configuration is obtained by changing the position of at least one of the axes A4, A5 and A6.

7. A method according to claim 1, characterized in that the torque constant ($k_t$) of the motor is calibrated by mounting a load with at least one known load parameter on the manipulator, whereupon the load parameter is identified according to steps a–f.

8. A method according to claim 1, characterized in that the second movement is so chosen that the torque contribution from the gravitation varies symmetrically around the midpoint of the movement.

9. A method according to claim 1, characterized in that for identification of the mass inertia, the moment of gravitational force is identified at at least two locations in the movement, for compensation of varying moments of gravitational force.

* * * * *